Sept. 4, 1928.

F. STRICKLAND 1,683,423

TRAP NEST

Filed Feb. 23, 1928

Inventor
Frank Strickland.

By Adam E. Fisher.

Attorney

Patented Sept. 4, 1928.

1,683,423

UNITED STATES PATENT OFFICE.

FRANK STRICKLAND, OF OKLAHOMA CITY, OKLAHOMA.

TRAP NEST.

Application filed February 23, 1928. Serial No. 256,184.

This invention relates to trap nests to be used in connection with poultry yards and the like.

The prime object is to provide a trap nest that requires no setting but is operated by the fowls.

Another object is to provide such a device that is simple and durable in construction and efficient in operation.

With the foregoing and other objects in view my invention resides in the novel construction and arrangement of parts as hereinafter set forth and claimed.

In the drawing

Figure 1:
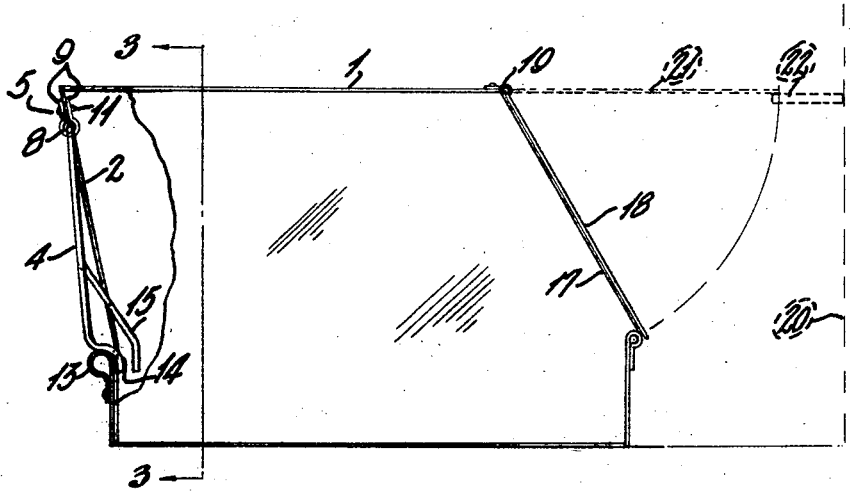
Figure 1 is a side elevation of my invention, partly broken away to show the mounting of the trap gate and there being indicated also, in dotted lines the arrangement of the nest when used as a separator.
Figure 2:
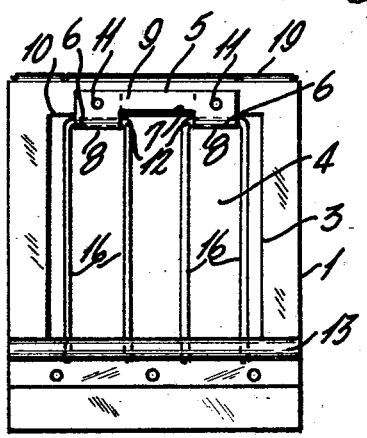
Figure 2 is a frontal elevation of my nest.
Figure 3:
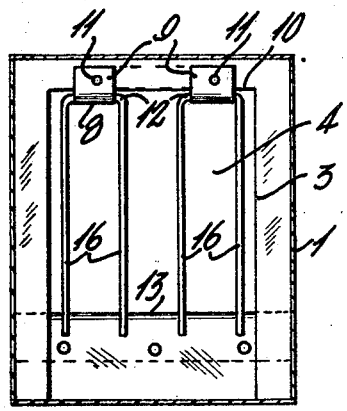
Figure 3 is a section along the line 3—3 of Figure 1.

In carrying out my invention, I provide a nest box indicated generally by the reference character 1. The front wall 2 thereof is inclined outwardly or forwardly as shown for a purpose to be hereinafter more fully described. A front aperture 3 is formed in the said front wall 2 and is provided with a sectional swinging gate indicated at 4.

The pivoting or hinging means 5 for the gate 4, is made of an elongated sheet of material bent longitudinally and medially forming a bight 6. The said bight 6 is cut out medially at 7 leaving the spaced looped hinge joints 8. The opposed ends or wings 9 of the structure thus formed are adapted to straddle the upper margin 10 of the front wall 2 and be fastened by rivets 11 passed therethrough.

Each section of the gate 4 is formed of a length of rod or wire bent into a U-shape and inverted, and having the bights 12 thereof loosely mounted in the said spaced looped hinge joints 8. The legs or stems of the U-shaped gate sections 16 extend substantially below the roll or bead 13 forming the lower edge of the aperture 3 and the two outer legs or stems are curved inwardly to fit the said roll 13 as shown at 14 in Figure 1. The inner or medial legs or stems are bent inwardly and downwardly as shown at 15 and are offset inwardly from the front wall 2 of the box 1. The said front wall 2 being inclined forwardly, as set forth, the normal tendency of the gate is to rest against the bead 13 this being the closed position. It may be easily understood that the gate 4 may swing freely inward as a fowl passes therethrough but is prevented from swinging outward by the lower ends of the outer stems of the said U-shaped gate sections 16 striking the roll or bead 13 along lower edge of the aperture 3. The inner legs or stems of the U-shaped gate sections 16 being offset inwardly, as stated, facilitates the entrance of the fowl into the nest.

The back wall of the nest box 1 has an aperture 17 which may be closed by a door 18 hinged at 19, and so adapted to open outwardly but not inwardly.

In the use and operation of the device when used as a trap nest the door 18 is closed and fastened, and the fowl upon entering the box 1 through the swinging gate 4 is held therein until removed by the poultryman.

When used as a separator nest to separate the laying fowls from the flock the nest is placed adjacent a convenient wall as indicated by the dotted lines 20 in Figure 1. The door 18 is opened as indicated at 21 in dotted lines, and held by a stop 22 as shown. This arrangement provides a hallway formed of the nest 1 and the wall 20 having for a top the opened door 18. The fowl upon entering the nest 1 can only escape into the hallway which may lead into a separating pen (not shown). It is obvious that any number of fowls, may thus be separated from the main flock without requiring any attention from the poultryman.

While I have herein set forth a preferred embodiment of my invention it is understood that I may vary from the same in minor detail of construction, not departing from the spirit of my invention and within the scope of the appended claims.

I claim:

1. In a trap nest, a box having an opening, a gate hinged from the upper margin of the opening, the said gate being adapted to open inwardly only and having downwardly extended stems, the outer stems for impinging the inner side of the lower margin of the said opening to prevent the gate swinging outwardly, the medial stems being offset inwardly from the said lower margin to facilitate the entrance of the fowl.

2. In a trap nest, a box having an opening, the wall of the box encompassing the opening being inclined outwardly from bottom to top, a gate hinged from the upper margin of the opening and adapted to swing inwardly, the said gate having a plurality of downwardly extended stems, the outer stems being adapted to impinge the inner side of the lower margin of the opening to prevent the outward swinging of the gate, and the medial stems being bent still farther inwardly at their lower ends so as to stand clear of the lower margin of the opening when the gate is closed.

In testimony whereof I affix my signature.

FRANK STRICKLAND.